United States Patent
Assuncao et al.

(10) Patent No.: US 9,456,308 B2
(45) Date of Patent: Sep. 27, 2016

(54) METHOD AND SYSTEM FOR CREATING AND REFINING RULES FOR PERSONALIZED CONTENT DELIVERY BASED ON USERS PHYSICAL ACTIVITIES

(71) Applicant: GLOBALFOUNDRIES Inc., Grand Cayman (KY)

(72) Inventors: Marcos dias De Assuncao, Sao Paulo (BR); Silvia Christina Sardela Bianchi, Sao Paulo (BR); Marco Aurelio Stelmar Netto, Sao Paulo (BR)

(73) Assignee: GLOBALFOUNDRIES INC., Grand Cayman (KY)

( * ) Notice: Subject to any disclaimer, the term of this patent is extended or adjusted under 35 U.S.C. 154(b) by 114 days.

(21) Appl. No.: 13/904,942

(22) Filed: May 29, 2013

(65) Prior Publication Data

US 2014/0357247 A1     Dec. 4, 2014

(51) Int. Cl.
| H04W 88/02 | (2009.01) |
| H04W 4/02 | (2009.01) |
| H04M 1/725 | (2006.01) |
| H04W 4/04 | (2009.01) |

(52) U.S. Cl.
CPC ......... *H04W 4/027* (2013.01); *H04M 1/72569* (2013.01); *H04W 4/028* (2013.01); *H04W 4/043* (2013.01); *H04W 88/02* (2013.01)

(58) Field of Classification Search
CPC ............ A61B 5/1118; A61B 2560/0242; H04W 4/027; H04W 4/028; H04W 4/043; H04W 88/02
USPC ............ 455/418, 419, 420, 3.02, 303, 550.1
See application file for complete search history.

(56) References Cited

U.S. PATENT DOCUMENTS

| 6,971,973 | B2 | 12/2005 | Cohen et al. |
| 7,653,380 | B2 | 1/2010 | Graefen |
| 8,152,694 | B2* | 4/2012 | Srinivasan ............ A61B 5/1118 482/1 |
| 8,271,413 | B2* | 9/2012 | Agarwal ........... G06F 17/30867 706/46 |
| 2003/0061206 | A1 | 3/2003 | Qian |
| 2004/0066919 | A1 | 4/2004 | Seligmann |
| 2006/0155854 | A1* | 7/2006 | Selgert .................... H04L 29/06 709/227 |
| 2009/0222342 | A1 | 9/2009 | Greene et al. |
| 2009/0287067 | A1 | 11/2009 | Dorogusker et al. |
| 2010/0131028 | A1* | 5/2010 | Hsu ...................... A61B 5/4815 607/42 |
| 2010/0292050 | A1* | 11/2010 | DiBenedetto ...... A63B 24/0062 482/9 |
| 2012/0239173 | A1* | 9/2012 | Laikari ................ A61B 5/1112 700/91 |
| 2012/0324286 | A1* | 12/2012 | Birnbaum ........... G06F 11/3608 714/26 |
| 2013/0097662 | A1* | 4/2013 | Pearcy .................. G06F 21/577 726/1 |
| 2013/0151343 | A1* | 6/2013 | Phan ...................... G06Q 30/02 705/14.64 |
| 2013/0190008 | A1* | 7/2013 | Vathsangam ........... H04M 1/00 455/456.1 |

OTHER PUBLICATIONS

Tayeb Lemlouma, et al., "Context-Aware Adaptation for Mobile Devices", Author Manuscript, Published in MDM2004, International Conference on Mobile Data Management (2004) pp. 106-111.

(Continued)

*Primary Examiner* — Jean Gelin

(74) *Attorney, Agent, or Firm* — Yuanmin Cai; Andrew M. Calderon; Roberts Mlotkowski Safran Cole & Calderon P.C.

(57) ABSTRACT

A method (and structure) includes receiving an input from a sensor on a mobile device. Based on the sensor input, a processor determines whether a user of the mobile device is engaged in a specific physical activity. A control setting on the mobile device is set for delivering content during a period the specific physical activity is detected.

19 Claims, 13 Drawing Sheets

(56) References Cited

OTHER PUBLICATIONS

Jennifer Kwapisz, et al., "Activity Recognition Using Cell Phone Accelerometers", Department of Computer and Information Science, pp. 1-9.

Ling Bao, et al., "Activity Recognition from User-Annotated Acceleration Data" Massachusetts Institute of Technology, 2004, pp. 1-17.

Jan D. S. Wischweh, et al., "Activity-Oriented Context Adaptation in Mobile Applications", pp. 1-12.

Gary M. Weiss, et al., "The Impact of Personalization on Smartphone-Based Activity Recognition", Department of Computer and Information Science, Fordham University, 2012, pp. 98-104.

* cited by examiner

METHOD AND SYSTEM FOR CREATING AND REFINING RULES FOR PERSONALIZED CONTENT DELIVERY BASED ON USERS PHYSICAL ACTIVITIES

BACKGROUND OF THE INVENTION

1. Field of the Invention

The present invention generally relates to making automatic settings for content delivery on mobile devices. More specifically, received sensor inputs are used by a processor to determine whether the mobile device user is engaged in a specific physical activity, and a control setting for delivering content can be automatically set during a period the specific activity is detected.

2. Description of the Related Art

Current portable (e.g., mobile) devices, such as tablets and smartphones, are equipped with motion sensors, often called accelerometers, which detect the orientation of the device and can help determining whether the user is moving the device or shaking it. This capability has been used for several purposes, such as adjusting the orientation of the screen of applications, shuffling songs while using a music player, and for various other functionalities in games and other applications. New portable devices and accessories are likely to incorporate physiological sensors that help to track the performance of users while carrying out physical activities, environmental sensors that monitor the conditions of the environment where the user is located, and sensing capabilities, such as a global positioning system (GPS) interface, for precisely tracking the user's location.

One prior art reference in this area provides an apparatus to alert a user of the arrival of an incoming message based on the user's physiological parameters. Another existing mechanism proposes different types of message delivery and response when a user refuses to receive an incoming message or ways of choosing different delivery options based on user preferences. Similar to these approaches, another method redirects Web pages based on the user context such as user location.

In other conventional methods, there are also advertisement systems that take into account the user's activity and systems for delivering customized content to be displayed on exercise devices based on the user's profile.

Yet another prior art mechanism proposes a method that selects specific content based on pre-defined conditions. That approach considers adjustment on content based on user activities. Methods for activity recognition have been proposed.

There is also prior art that adapts the behavior of an application based upon user activity but this method does not perform content adaptation based on the user physical activity. Another existing work proposes method for rule-based content delivery or advertisement but does not consider the physical activity or other sensor information.

The present inventors have recognized that these approaches do not provide a method for message delivery customization as based on the user's current location and activity. They have also recognized that these conventional approaches do not utilize recent advances in shared computing infrastructure that potentially permit an even higher level of delivery customization for mobile devices, as based on accessing information available from multiple users of portable devices that have connected to a shared computing infrastructure.

SUMMARY OF THE INVENTION

Thus, in a first exemplary aspect, the present inventors have recognized that these sensing functionalities of portable devices can be further leveraged to track a user's physical activity and adapt and deliver content according to his/her preferences and the kind of activity he/she is performing.

Moreover, the present inventors have recognized that a portable device user often would benefit from the ability to customize how content and notification messages are delivered under various activities or combinations of body movement and other physiological conditions, including possibly other sensor inputs indicative of local ambient conditions. In this first aspect of the present invention, a user can define rules for content delivery that are based on sensors on the user's own portable device to control content delivery based on the user's current physical activities.

In a second exemplary aspect, the present inventors have further recognized that such adaptation capability could additionally benefit from a process that derives and defines rules based on information from other users. That is, in the second aspect, these rules of content delivery can be defined and/or redefined using a shared computing infrastructure that hosts rule preferences from multiple users. In one example, this feature of the present invention assists users to define/redefine their own rule preferences based on a majority of users' preferences and can, for example, help determine users' context because it hosts historical data from several users.

This second aspect thus extends the first aspect to provide a system and method for determining the most likely activities in a geographical location, weather condition, and time and refines rules for determining which content adaptation actions are most likely to satisfy the majority of users during their physical activities. In this second aspect, the present invention provides a mechanism by which sensor information from multiple users of portable devices can be collected to serve as a source of shared data for information that is useful for adapting content delivery for other users in a given location and set of conditions, including conditions indicative of presumed physical activity for each user, as derived from sensors on their respective mobile device.

Thus, this second aspect is directed to computing infrastructure that is potentially accessed or shared by a plurality of users of mobile devices. As intended in the context of the present invention, the term "shared computing infrastructure" means any computing infrastructure that potentially permits information from multiple users of mobile devices to be collected, stored, and accessed for information derived from sensors incorporated in these mobile devices for purposes described herein. Non-limiting examples of shared computing infrastructure include, for example, data centers, single remote servers (e.g., servers on a network), including the cloud infrastructure, in which a cloud provider makes available computing capability to multiple users. It is further noted that "mobile device" and "portable device" are used interchangeably in this description, with no intent of distinction.

Accordingly, in a first exemplary aspect of the present invention, to achieve the above features and objects, described herein is a method including: receiving an input from a sensor on a mobile device; determining, using a processor and based on the sensor input, whether a user of the mobile device is engaged in a specific physical activity; and making a control setting on the mobile device for delivering content during a period the specific physical activity is detected.

In another exemplary aspect of the present invention, also described herein is a mobile device, comprising: a sensor; and a processor for making a control setting on the mobile device for delivering a content during a period a specific activity is detected, as based on outputs from the sensor.

In yet another exemplary aspect of the present invention, also described herein is a method, as executed by one or more computers, in a shared computing infrastructure, including receiving information from a user mobile device, including information related to a sensor on the user device; and determining a control setting for the mobile device for delivering a content during a period a specific activity is detected, as based on outputs from the sensor.

The present invention can thus be viewed as a mechanism that can improve the experience of mobile devices by automatically adapting the content delivery based on sensors whose outputs can be the basis for determining the user's own current activity. If additionally the mobile device is accessing information from a shared computing infrastructure, it can automatically adapt content delivery rules based on others' preferences when performing similar physical activities at a given location under similar conditions such as time, weather condition, environmental luminosity, and noise level, etc.

BRIEF DESCRIPTION OF THE DRAWINGS

The foregoing and other purposes, aspects, benefits, and advantages will be better understood from the following detailed description of a preferred embodiment of the invention with reference to the drawings, in which.

DETAILED DESCRIPTION OF EXEMPLARY EMBODIMENTS OF THE INVENTION

Figure 1:
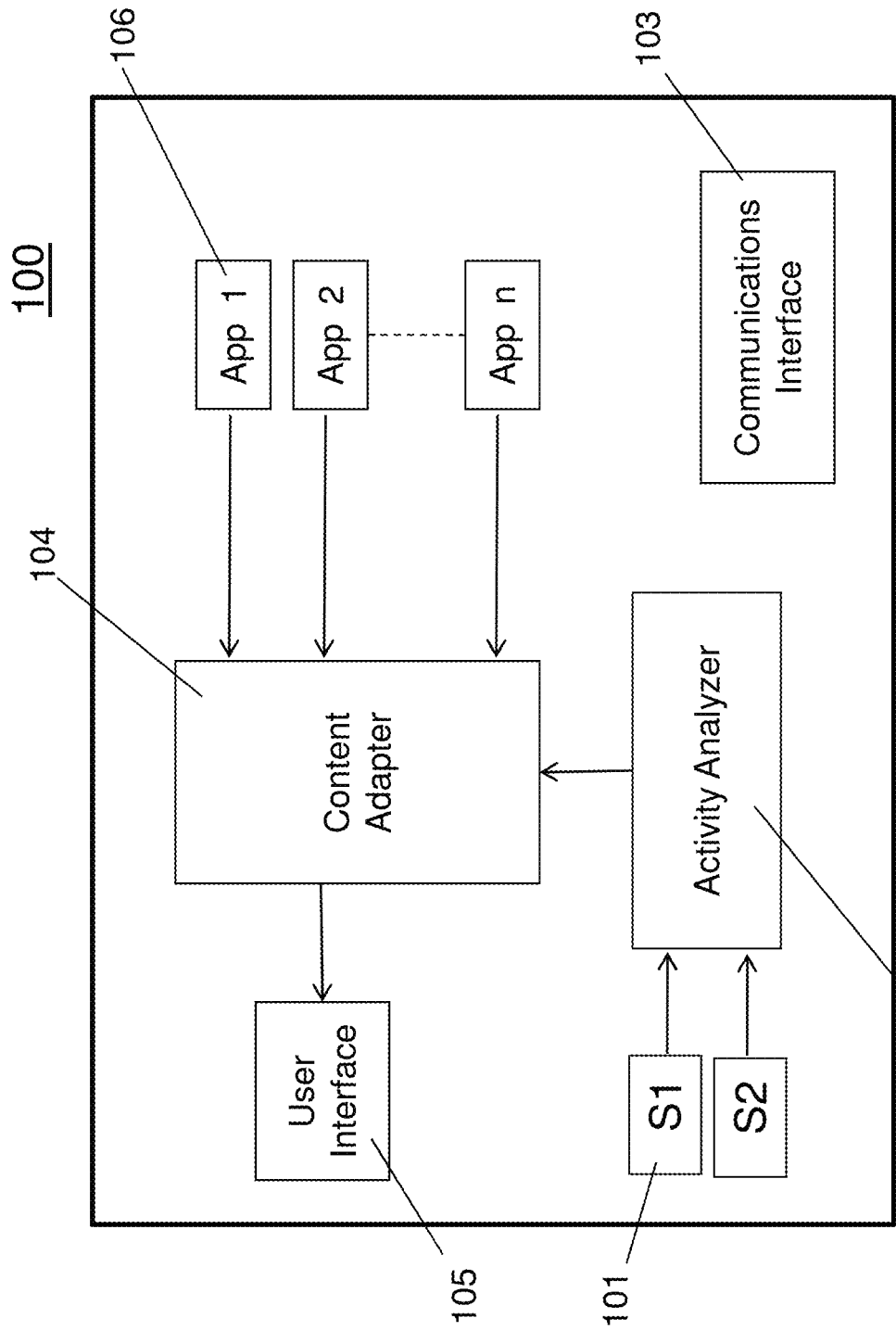
FIG. 1 shows an exemplary embodiment of the present invention in which user mobile device 100 has one activity analyzer and one content adapter.

Referring now to the drawings, and more particularly to FIGS. 1-13, there are shown exemplary embodiments of the method and structures according to the present invention.

In its first exemplary aspect, the present invention provides a system and method for (i) customizing how content is delivered under different physical activities that a user might be performing; and (ii) adjusting the content and notification messages delivered to the user, based on the physical activity that he/she is currently performing. The type of physical activity carried out by the user is inferred from data collected from sensors such as accelerometers, physiological sensors, GPS (global positioning system), etc.

The benefits of this first aspect of the present invention include, but are not limited to:

Automatically adapt the content delivery based on the user's own physical activity.

Help prevent the user from missing relevant content in such applications as email, messaging, and incoming calls.

Improve the user's experience even when the user is doing different physical activities.

In its second exemplary aspect, the present invention further provides a system and method for determining the most likely activities performed in a geographical location, weather condition and time, for example, period of the day, day of the week, holidays, etc. In addition to any number of sensors indicating location, relative location, and/or physical motion of these types of portable/mobile device, other sensors that might be useful in this aspect include data for clock and calendar functions, temperature, environmental luminosity, ambient noise level sensors, etc.

In this second aspect, the method also allows users to rank the activities they most perform on a given location and define/refine the way they want to receive content when performing each activity. Such ranking and refinements can also be used for deriving and refining rules on what content adaptation actions are most likely to satisfy the majority of users during their physical activities, if information is shared among a plurality of users via a computing infrastructure that permits such information sharing. Another feature of the second aspect is a voting mechanism wherein users can provide feedback on preference rules for specific locations.

The benefits of this second aspect of the present invention include, but are not limited to, those described above for the first aspect and additionally include the advantage of permitting the defining of a set of rules based on the users' behavior and environments conditions to adjust the content delivery accordingly, as well as the benefit of using information from others' sets of rules under similar conditions, as accessed from a shared computing infrastructure.

Before turning to exemplary embodiments that better demonstrate the structure and method of the first aspect of the present invention, some examples and applications are first described.

1) Email and Calendar Application

An application used to manage emails and calendar—such as Lotus Notes™—can deliver notification messages and content to the user interface in different ways according to the activity that the user is performing. For example, the user might go jogging in the morning, as he/she usually does, and has connected his/her headset to the device including the present invention, to listen to some music. Assume that an important meeting is cancelled while the user is running.

Instead of sending a text message, or reading out the content of the text message at a pre-configured speed, the activity analyzer component of the present invention can identify the type of activity that the user is performing, measure environmental conditions such as noise level and the configured sound volume, and determine what would be the best way to deliver the message. The solution might consist, for example, in slightly increasing the volume and reading the message out slower than the usual speed.

2) Cycling and Web Browsing News

In this second example, a user might be cycling at the gym and opens his/her device to read news via a web browsing application. The present invention can identify the physical activity and determine that a website with a more illustrative and bigger font sizes should be used to provide news-related content to the user. The number of figures and the font sizes could be determined by the intensity of the physical activity.

Thus, from the two examples above, the user him/herself might want to customize the content delivery for different activities and/or different types of activities, including creating rules that customize content delivery for different activities.

FIG. 1 shows an exemplary embodiment of a mobile device 100 that demonstrates the first aspect. In the context of the present invention a mobile device 100 is any device, such as a smartphone or a tablet, that can run applications and is equipped with one or more sensors 101 that help in determining the kind of physical activity that its user is performing, or the type of environment in which he/she is located. Examples of such sensors include accelerometers, physiological sensors, environmental sensors, and GPS, but this listing of sensors is not considered as limiting. It is noted that implementation of such sensors may be primarily hardware, such as an accelerometer or noise or luminosity meter, or may have primarily software aspects, such as a GPS processing or receiving local weather information from a remote server, or a combination of hardware and software.

Mobile device 100 comprises other sub-components related to the present invention, including activity analyzer 102. The activity analyzer 102 receives information from sensors 101 in the mobile device, such as accelerometers and physiological sensors, and attempts to determine the kind of activity that the user is performing at a particular moment. In some exemplary embodiments, the mobile device 100 also provides part of this information to a shared computing infrastructure, such as a cloud provider, so that the shared computing infrastructure can track the activities performed by users in certain regions when they perform the activities and can build profiles with user activity information.

In these exemplary embodiments, the user mobile device 100 also includes a communication interface 103 and software adapted to interface with a shared computing infrastructure such as a cloud provider, although one of ordinary skill in the art would recognize that the mobile device 100 itself could be configured to achieve effects of the present invention without interface of a cloud provider or other shared computing infrastructure mechanism. It is further noted that, although the term "cloud provider" is used in the following explanation, the use of such term is not intended as limiting, since the cloud is only one exemplary form of shared computing infrastructure that could be used for the information sharing aspects of the present invention.

Content adapter 104 receives information from activity analyzer 102 about the activity that a user is performing and adapts the content and notifications delivered to the user according to the performed activity. User Interface 105 provides interface functions between the user and applications 106 on the device 100.

Figure 2:
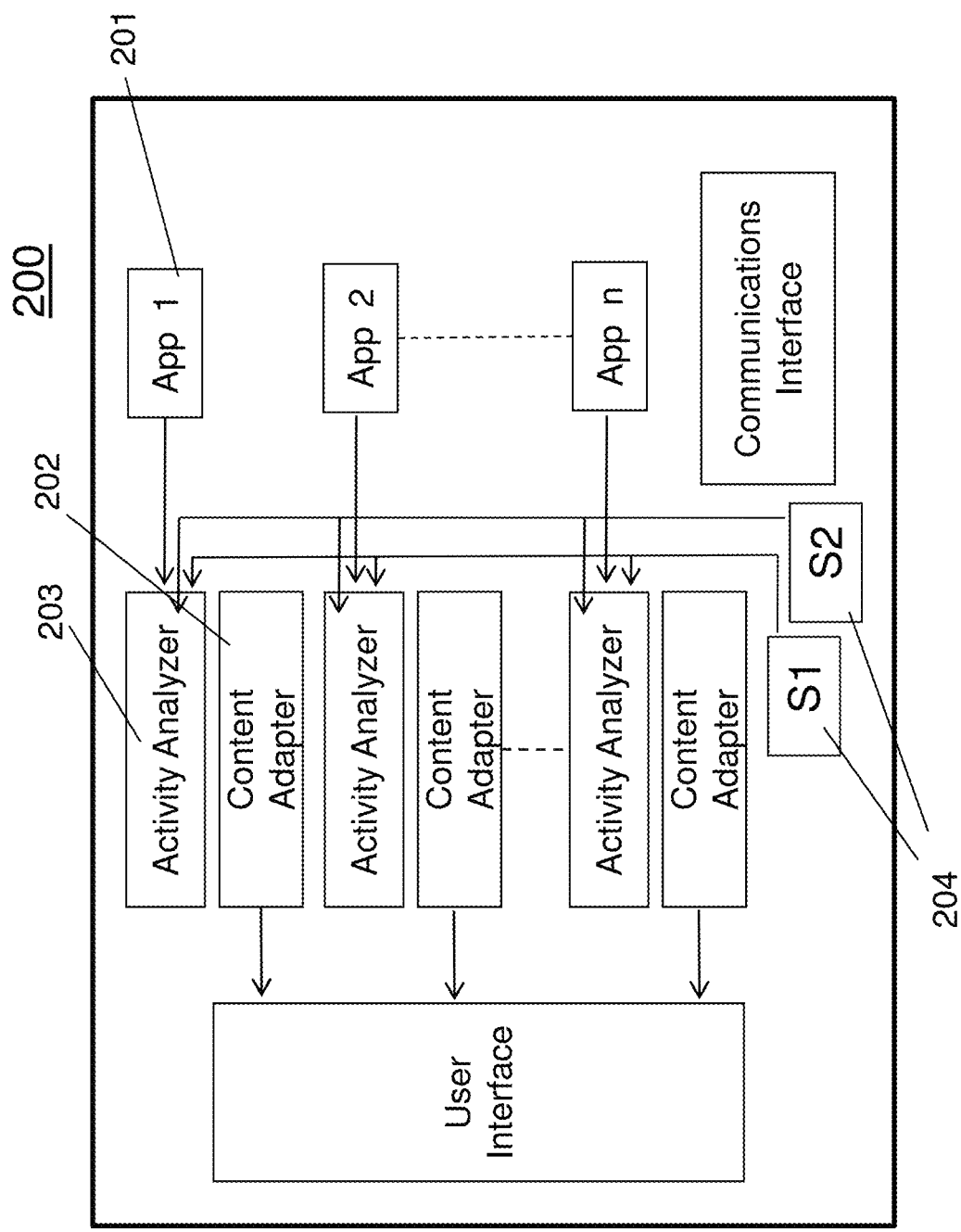
FIG. 2 shows an exemplary embodiment in which the mobile device 200 has one activity analyzer and one content adapter per each mobile application.

FIG. 2 shows exemplarily an alternate embodiment of a mobile device 200 in which each application 201 has its own content adapter 202 and activity analyzer 203. Sensor(s) 204 provide inputs into all activity analyzers 203.

Figure 3:
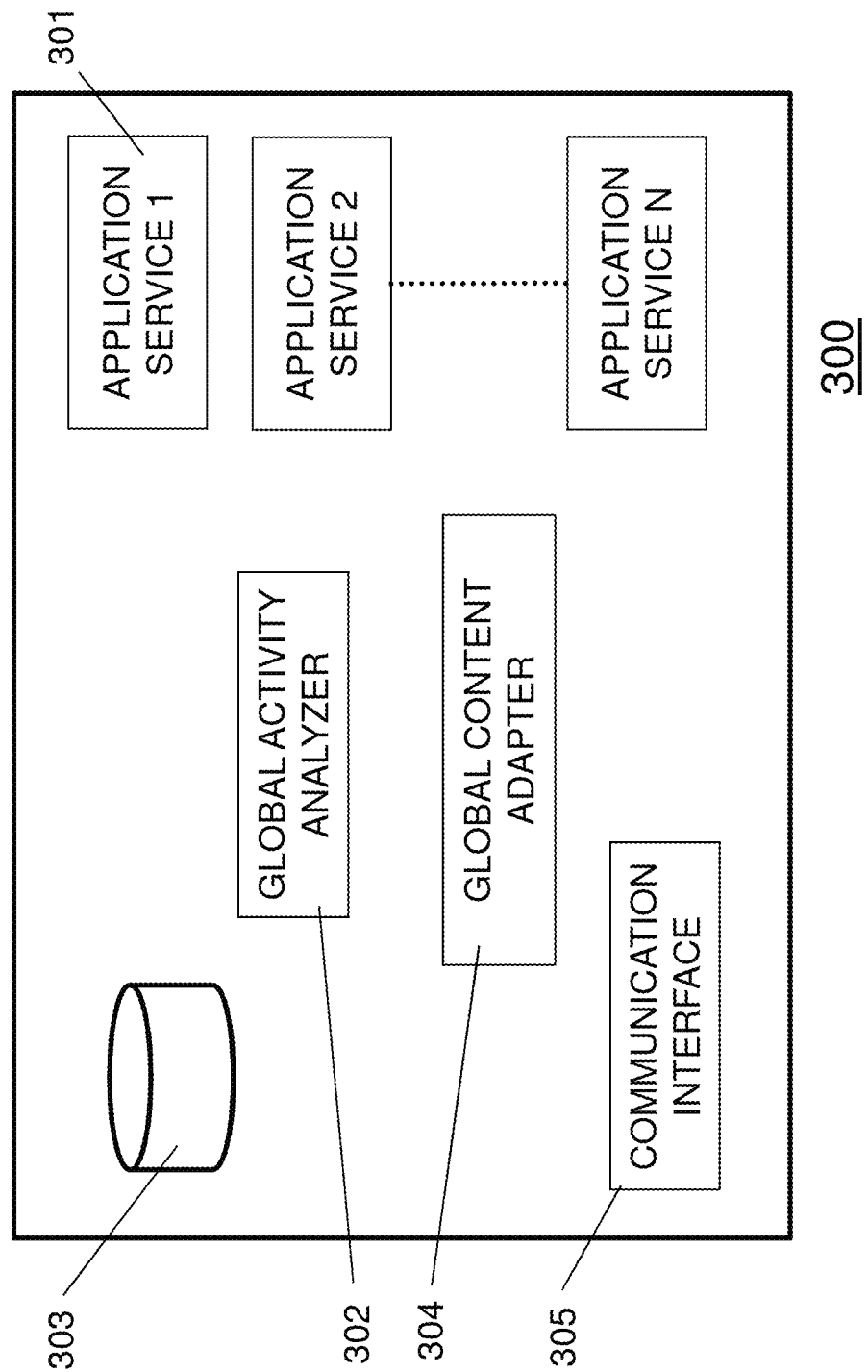
FIG. 3 shows an exemplary embodiment of a cloud infrastructure 300 in which each cloud has one global activity analyzer and one global content adapter.
Figure 4:
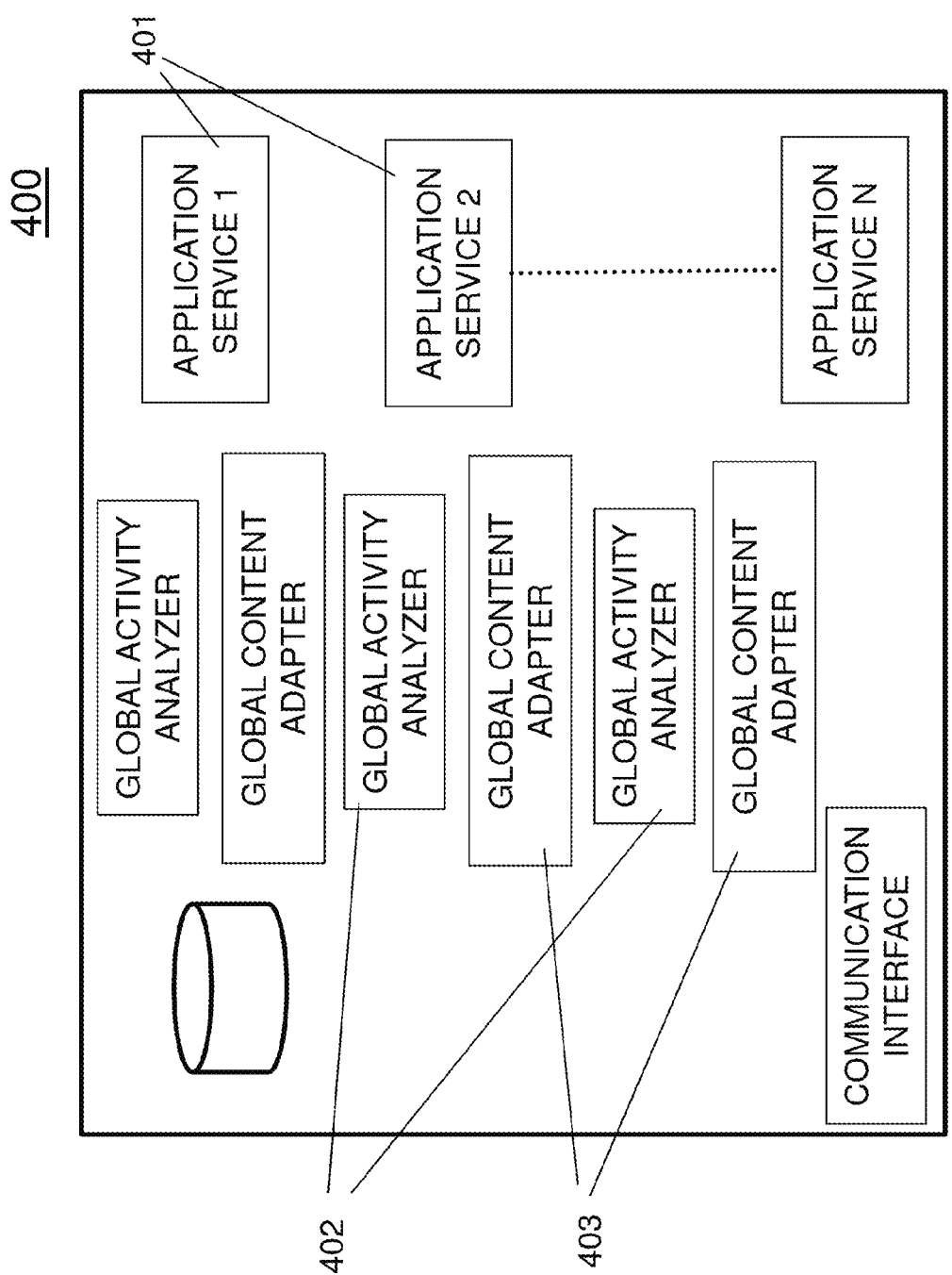
FIG. 4 shows an exemplary embodiment of a cloud infrastructure 400 in which each application service of a cloud has its own global activity analyzer and global activity adapter.

Both of these two exemplary embodiments of mobile devices 100, 200 of the present invention could involve interface with a shared computing infrastructure such as cloud services. Thus, another aspect of these exemplary embodiments involves components of the shared computing infrastructure. FIGS. 3 and 4 show exemplarily embodiments of components of a shared computing infrastructure such as cloud infrastructures 300, 400.

In the context of the present invention, a cloud infrastructure refers to the IT (information technology) infrastructure used to host services whose produced content is consumed by applications running on mobile devices. The cloud infrastructure can also be utilized by users of mobile devices to synchronize their personal data across multiple devices. Again, it is noted that the cloud infrastructure is only one exemplary format of shared computing resources that could be used for implementing concepts of sharing user information for purpose of establishing settings for content delivery on users' mobile devices.

As shown in FIG. 3, in addition to the usual components that a cloud infrastructure may offer, it also comprises the following sub-components 300 to support the present invention. Application services 301 refer to the services provided by the cloud provider to applications 106 running on the mobile devices 100 shown in FIG. 1. These services might, for example, deliver content and notification messages that are intercepted by applications 106 on mobile devices 100 and displayed to the end user through various media on the device 100.

Global activity analyzer 302 is a cloud infrastructure component that uses data collected from sensors 101 on mobile devices 100 and, along with user information stored in a memory device 303 on the cloud infrastructure 300, attempts to determine the kind of activity that a user is performing at a given moment. In an exemplary embodiment, an attempt is made to establish a profile per each user, with information about his/her usual schedule and what kind of activities he/she often performs during various parts of the day. Information stored in the cloud, such as the user's calendar and the calendar of friends can aid in determining the activities that the user generally performs.

Global content adapter 304 is a cloud infrastructure module responsible for adapting the content or notification messages provided to the user based on the determination of the physical activity that the user might be performing. Communication interface 305 provides the hardware and software for communicating with mobile devices.

At this point, it is noted that, in the context of the present invention, a cloud provider is an entity that provides cloud computing as a service. Cloud computing is commonly understood as referring to the use of computing resources, including typically both hardware and software, delivered as a service over a network, typically the Internet. Typically, end users access cloud-based applications through a web browser or a light-weight desktop or mobile app, while the business software and user's data might be stored on servers at a remote location.

FIG. 4 shows a cloud infrastructure 400 in which each application service 401 has its own global activity analyzer 402 and global content adaptor 403.

Figure 5:
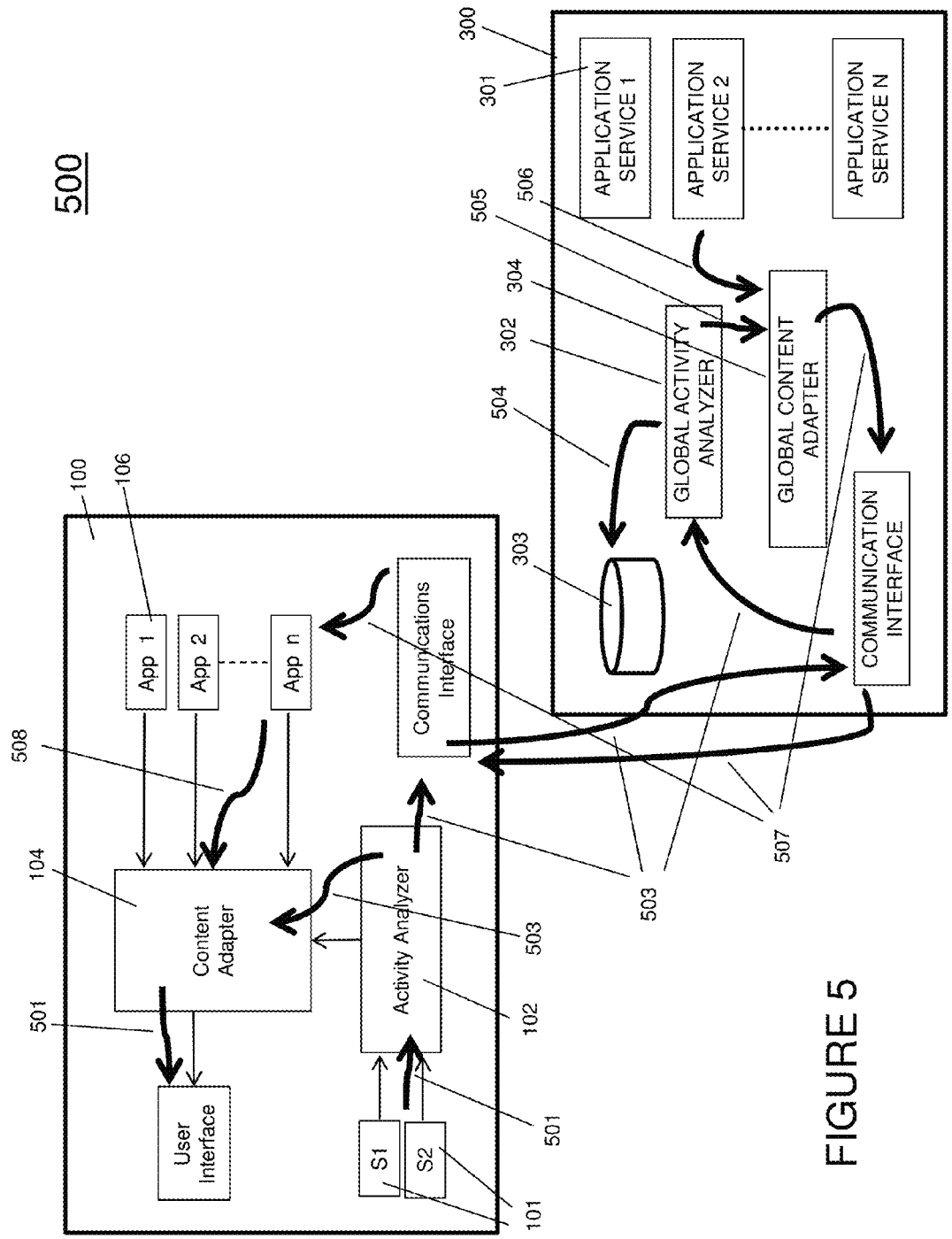
FIG. 5 shows an exemplary scenario 500 using the user device 100 of FIG. 1 and the cloud infrastructure 300 of FIG. 3.
Figure 6:
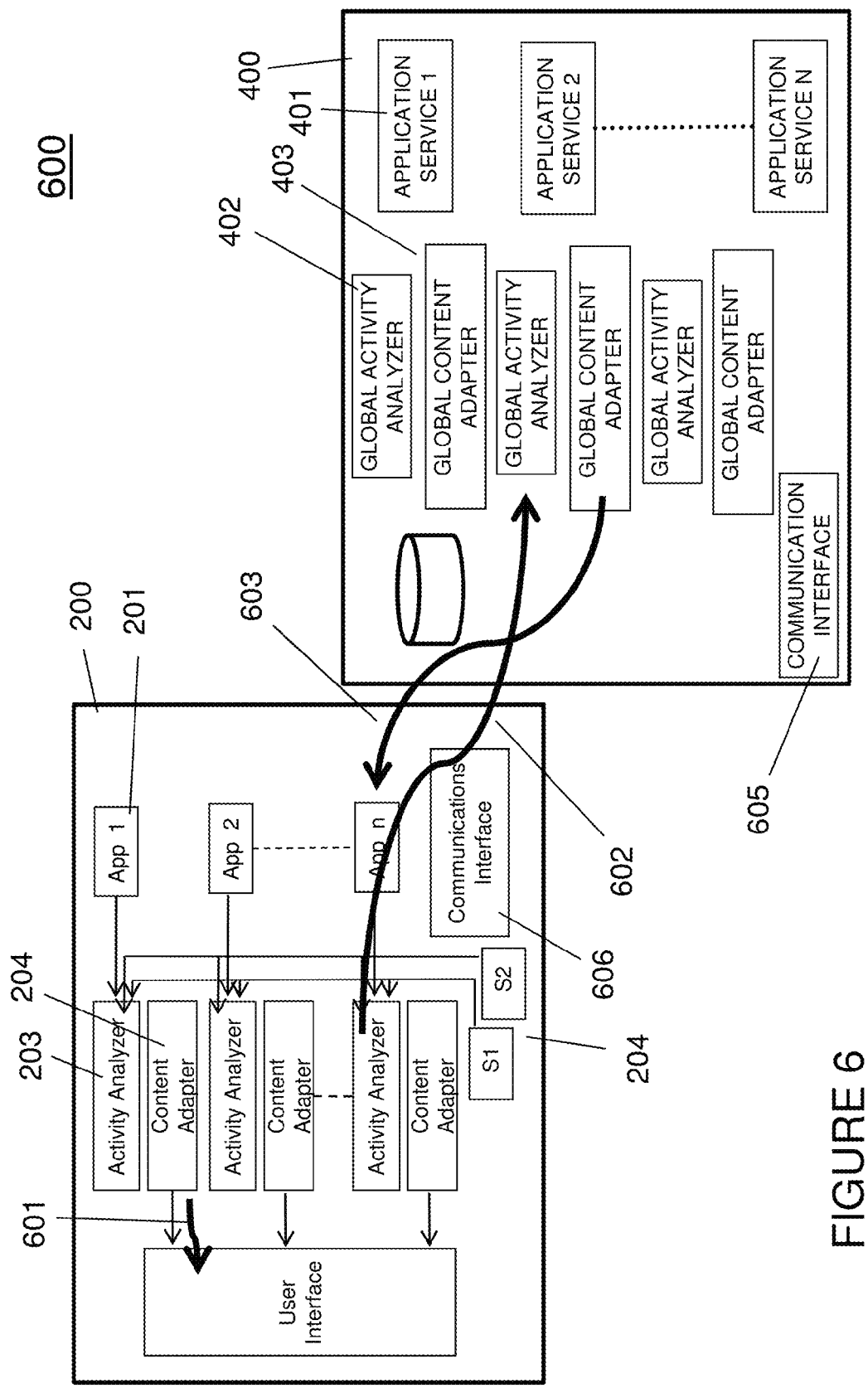
FIG. 6 shows an exemplary scenario 600 using the user device 200 of FIG. 2 and the cloud infrastructure 400 of FIG. 4.

FIGS. 5 and 6 show two exemplary scenarios 500, 600 in which mobile devices 100, 200 from FIGS. 1 and 2 can respectively interface with cloud providers shown in FIGS. 3 and 4, but there are clearly other combinations for interactions between mobile devices and shared computing infrastructure.

FIG. 5 shows a possible sequence 500 of events of the interactions between a mobile device 100 with a single activity analyzer 102 and a single content adapter 104 and a shared computing infrastructure 300. In this exemplary scenario, in step 501 activity analyzer 102 receives information from one or more sensors 101, and uses this information to determine the kind of activity and body movement that the user is experiencing at the moment. This information about activity is provided in step 502 to the content analyzer 102 and, in step 503, to the global activity analyzer 302 of cloud provider 300.

FIG. 5 also exemplarily illustrates an embodiment where a cloud provider runs multiple services 301 that deliver content to applications 106 running on mobile devices 100. The cloud provider 300 has a global activity analyzer 302 that receives information from the activity analyzer 102 of each user's mobile device 100, in step 503. Global activity analyzer 302 users this information to help determining the activity that a user is performing, and this information is utilized for building user profiles that are stored in a repository 303, in step 504. Information about user activities and profiles is passed to the global content adapter 304 in step 505, which employs this information to adapt content created by services 301 in step 506, and delivers the adjusted content to mobile applications 106 in step 507.

The applications 106 running on the mobile device 100 consume content created by cloud services 301. The content is either used and processed by the applications 106 or passed directly in step 508 to the content adapter 104, depending upon specific details of the intended adaptation. The content adapter 104, based on the activity information sent by the activity analyzer 102 and/or app 106, adjusts the content and messages to be delivered to the user interface 105, in step 507.

It should be clear that other configurations and combinations of embodiments could result in different sequences of events from those exemplarily shown in FIG. 5.

For example, as an alternate exemplary embodiment, FIG. 6 shows a mobile device 200 where each application 201 has its own content adapter 204 and activity analyzer 205. Different from the embodiment described in FIG. 5, in this second scenario 600 each activity analyzer 203 is responsible for using the information gathered by the sensors 204, determining the activity and passing it to content adapter to be used by the application to adjust the content that it delivers, in step 601.

FIG. 6 also exemplarily shows a scenario where each service 401 of the cloud provider 400 has its own global content adapter 403 and global activity analyzer 402. In step 602, a specific global adapter 403 transmits adaptation information to a specific application 201 of the mobile device (via communication interfaces 605, 606).

Figure 7:
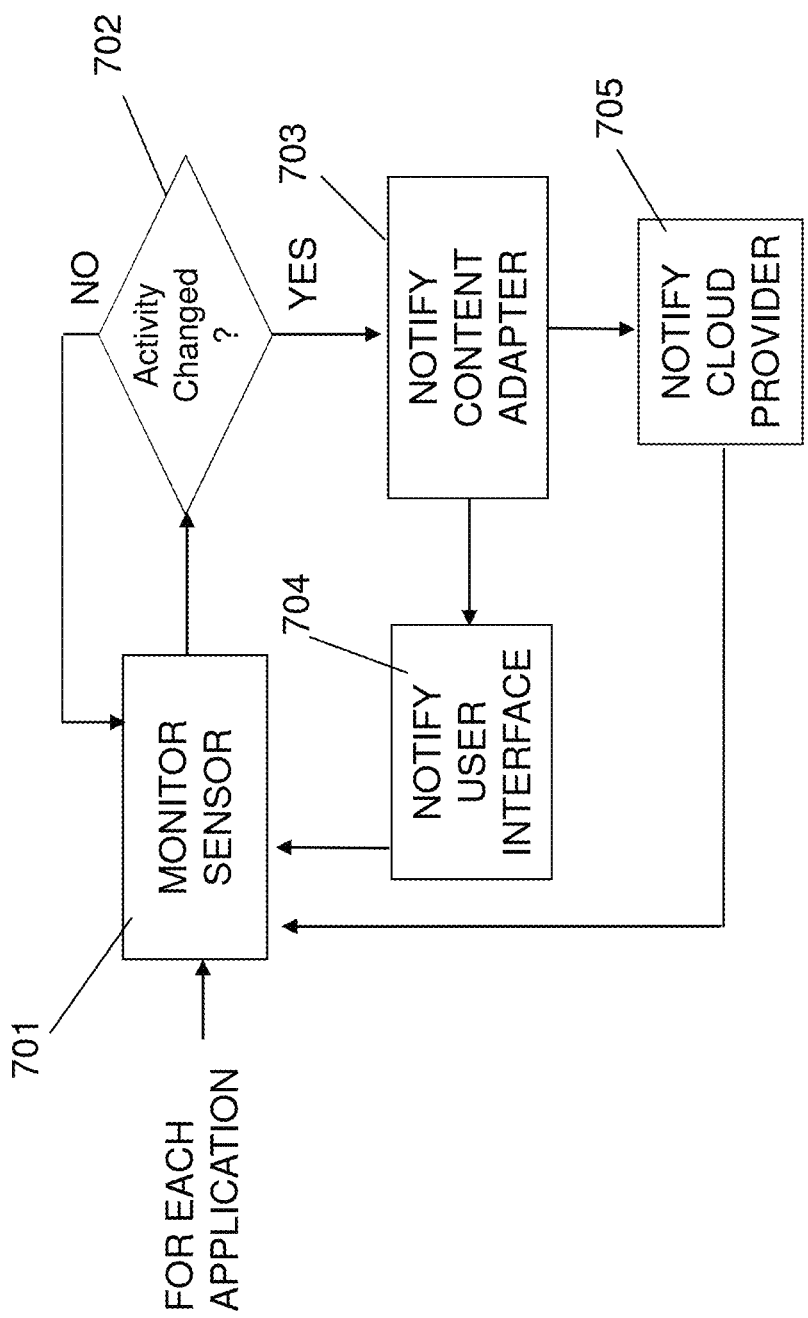
FIG. 7 shows an exemplary method 700 for content adaptation on the device side.

FIG. 7 shows in flowchart format 700 an exemplary method used by the device side for content adaptation. For each application that contains a content adapter, in step 701, the activity analyzer monitors the user device's sensors to determine, in step 702, if user activity has changed for that application. If the activity analyzer detects a change in user activity, in step 703, the activity analyzer notifies the content adapter so content delivery can be modified according to the user activity, and, in step 704, as transmitted to the user interface. If a cloud provider is involved, the activity analyzer also notifies the cloud provider about the user activity changes, in step 705.

Figure 8:
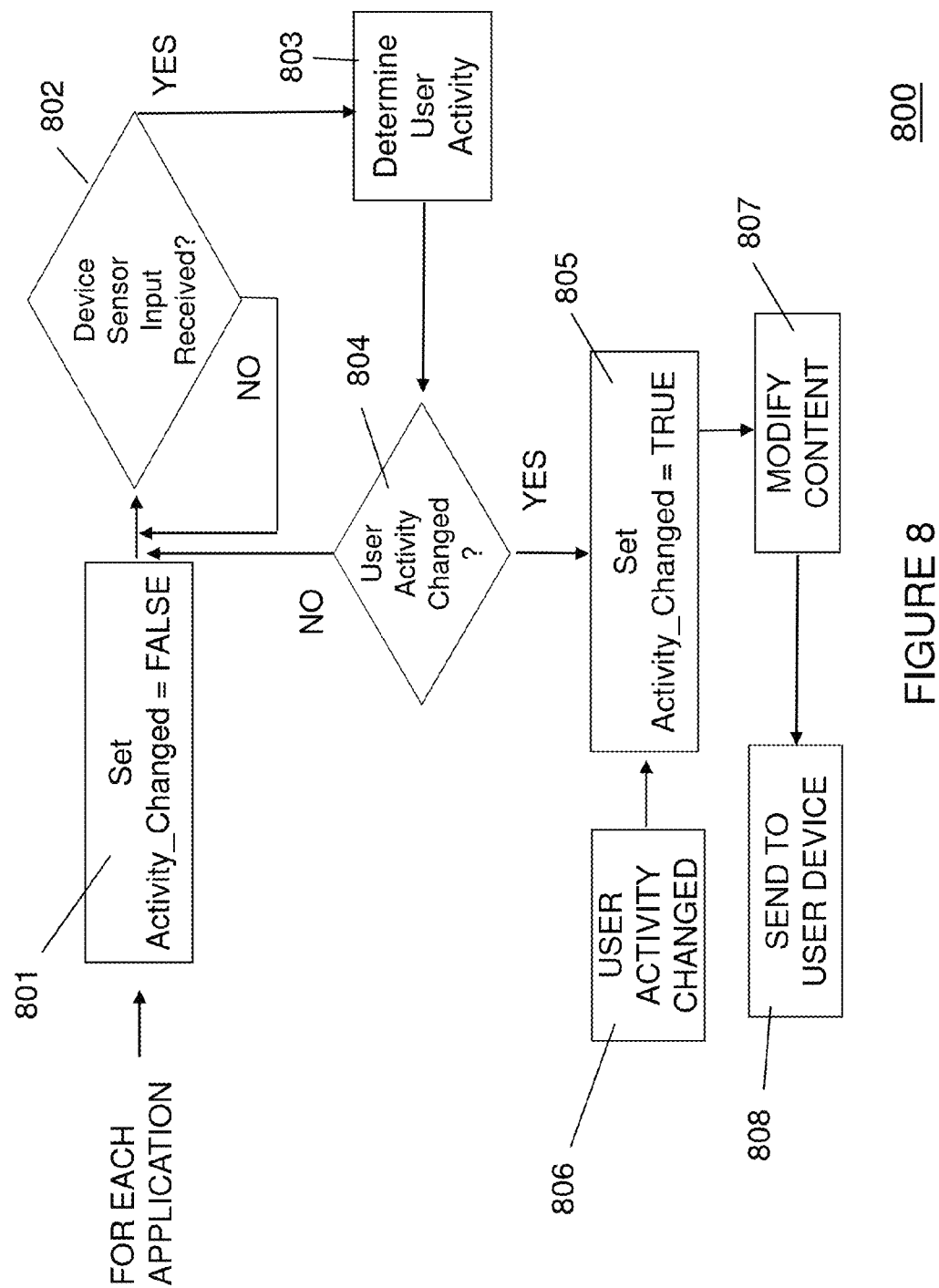
FIG. 8 shows an exemplary method 800 for content adaptation on the cloud provider side.

FIG. 8 shows in flowchart format 800 an exemplary method for content adaptation at the cloud provider side, when used. For each application service that contains a global content adapter, in step 801, the activity_changed variable is initially set to FALSE. In step 802, the cloud provider monitors for any input information received from a mobile device. Upon determining that information has been received about a user activity in step 803, the global content adapter uses the global activity analyzer to determine in step 804 if there is user activity change. In step 805, if user activity has changed the global activity analyzer changes the activity_changed to TRUE.

Similarly, in step 806, if the cloud provider receives indication from a user device that activity for a user has changed, the activity_changed variable is similarly changed to TRUE in step 805. In step 807, global content adapter modifies content delivery, if appropriate, and, in step 808, the modification is transmitted to the user device.

Thus, as described above, in the first exemplary aspect, the present invention provides a system and method for adapting content and delivery of messages based upon different physical activities the user is currently performing, including possibly interface with shared computing infrastructure for determination of content delivery adaptation.

Content Adaptation Actions Using Rule Derivation and Refinement

In a second exemplary aspect the present invention is directed to the separate issue related to the preference rules on such content adaptation actions, as described above in the first aspect. More specifically, in this second aspect, rules are derived and refined to provide content adaptation actions that are most likely to satisfy the majority of users during their physical activities, as based on interfacing with the shared computing infrastructure.

Each user is again assumed to have a device, such as a smartphone or a tablet, that can run applications and is equipped with sensors that help in determining the kind of physical activity that its user is performing and the type of environment in which he/she is located.

The present inventors have noted that no existing system considers (i) ranking physical activities based on factors such as weather, time, etc., and (ii) deriving and refining rules on what content adaptation actions are most likely to satisfy the majority of users during their physical activities. As explained above, the shared computing infrastructure can be configured to store different information about users and the different activities performed by them.

Figure 9:
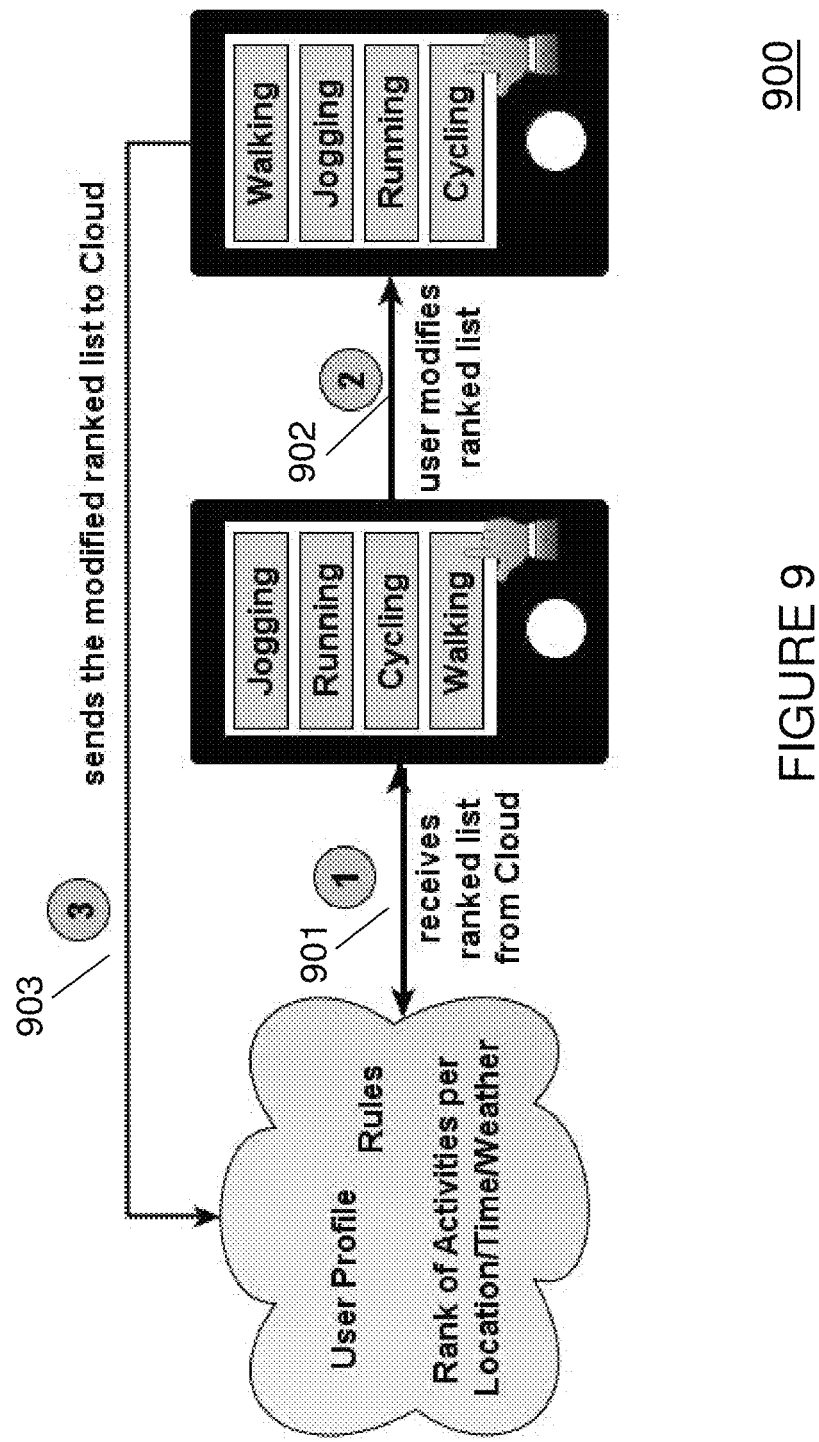
FIG. 9 shows an example 900 of ranking of activities for a specific location, time, and weather condition.

FIG. 9 presents an example 900 of the ranking feature of the second aspect of the invention, as exemplarily demonstrating that the mostly likely activities performed by a specific user in a given location (e.g., public park), time (e.g., Saturday morning, days of the week, and holidays) and weather condition (e.g., sunny) to perform some physical activity (e.g., walking). In step 901, when the user activates his/her device, the device forwards to the cloud provider the user's geographical location, time, and weather of his/her location in order to obtain a ranked list of the activities most performed in that specific scenario.

The user may select one activity, modify the ranked list, or ignore the information concerning activities. In case that the user selects, in step 902, one activity or modifies the list according to the activities that he/she performs at that location, time of the day, and weather, the information is delivered to the cloud provider in step 903 and stored in the user profile repository, where it can be used to compute a new ranked list of activities for certain locations/time, and thus is used to derive or refine rules for this and other users. If the user does not select any activity from the list, the activity information is updated in the cloud provider when the user performs some physical activity and the device detects it, in the manner described above for the first aspect.

Thus, based on the historical information about physical activities that the users perform and other attributes such as location and environmental conditions, the system creates a set of preference rules for delivering the content. These preferences can be refined based on the attributes' thresholds for example physical activity intensity and noise near to the user (see rule definition below). The thresholds can be defined using any comparison operator ($\leq, <, >, \geq, =, \neq$, etc.).

An example of a rule is presented below in Rule Example 1. In this Rule Example 1, for the physical activity jogging at a medium speed in a noisy environment, an incoming message will be read at a high volume.

Rule Example 1:

(Jogging AND Speed=Medium) AND (Environmental noise AND Volume=High) Message=Read Volume=High Speed=Low More generically, an exemplary rule definition can be any logic combination involving detected activity and one or more attributes. If this combination of physical activity and attributes is detected, then the specific preference P for that combination is considered to be activated. Although the following exemplary uses the AND operator, it should be clear that other logical operators and combinations could likewise be used to form a rule definition for a preference P:

---
Rule Definition: (Physical activity AND Threshold (physical_activity)) AND (Attribute_1 AND Threshold (attribute_1)) AND (Attribute_2 AND Threshold (attribute_2)) AND (Attribute_n AND Threshold (attribute_n))
    Set Preference P_n
---

List of exemplary (and non-limiting) possible attributes include: physical activity, physical location, environmental noise, environment luminosity, calendar data, current time, and weather.

Relative to weather, this attribute could be significant in several aspects in the context of the present invention. For example, if it is raining, the environment may be more noisy, if the temperature is too low, the user may not want to see the screen of the device. It is noted that, relative to the aspect of the present invention by which mobile devices are connected to shared computing infrastructure, current weather could be derived as implied from sensing current location in combination with local weather conditions as received from information from the shared computing infrastructure. Thus, simply connecting to a shared computing resource could provide additional information to mobile device users for automatic settings of content delivery. It should be noted that, as is well known in the art, each attribute exemplarily listed above will have its respective properties, such as a range of values (e.g., temperature ° C., noise level dB, speed m/sec), and that there might be types of categories, such as rainy or sunny weather. Moreover, there could also be Boolean expressions used in defining attributes or conditions, such as "having a meeting" versus "having an urgent meeting".

At this point and as an aside that contrasts to detecting high levels of motion indicative of specific activities, it is noted that low levels of movement in specific locations may also have significance for rules related to content settings on mobile devices. For example, if the user is in a location of a meeting room, low movement might indicate that the user is currently attending a meeting, and the preferred rule might be to simply turn on a vibrator for incoming calls or emails or messages.

Figure 10:
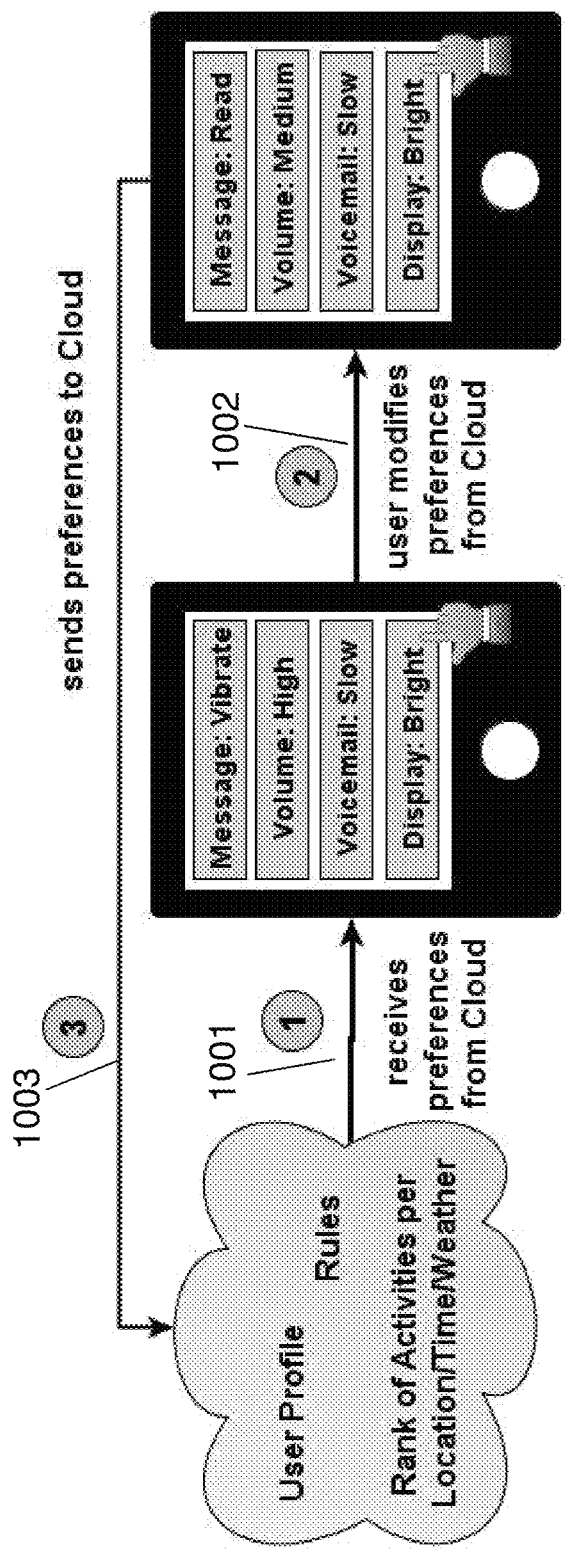
FIG. 10 shows an example 1000 of preference settings modification by a user for a specific physical activity.

FIG. 10 illustrates an example 1000 of preference settings for a specific physical activity, based on interaction with a shared computing infrastructure. When a user selects a physical activity from the ranked list or if the device detects the physical activity that the user is performing, as aforementioned, this information is sent to the cloud provider. Then, the cloud provider selects a preference P_n from the rules for this specific activity and forwards this information to the device in step 1001. The preference settings are composed of a set of attributes (e.g., notification, incoming message, voicemail, display, etc.) and thresholds (e.g., size of font, volume, etc.) defining how the content is to be delivered. The user may personalize and modify the settings according to his/her preferences, in step 1002. The new preference settings are sent to the cloud provider in step 1003 and stored in the user profile repository, where it can also now be used to refine/redefine the rules to this and other users.

Because the present invention provides the possibility of interactions with shared computing infrastructure, in an exemplary embodiment it can also provide another aspect of preferences in that individual preferences can also be derived from others users' behavior. Thus, in this aspect, the shared computing infrastructure accumulates information for specific locations such that it detects group behavior patterns at that location, thereby creating preferences that can be presented to a first-time user at that location as a possible preference listing for that location for various physical activities.

Figure 11:
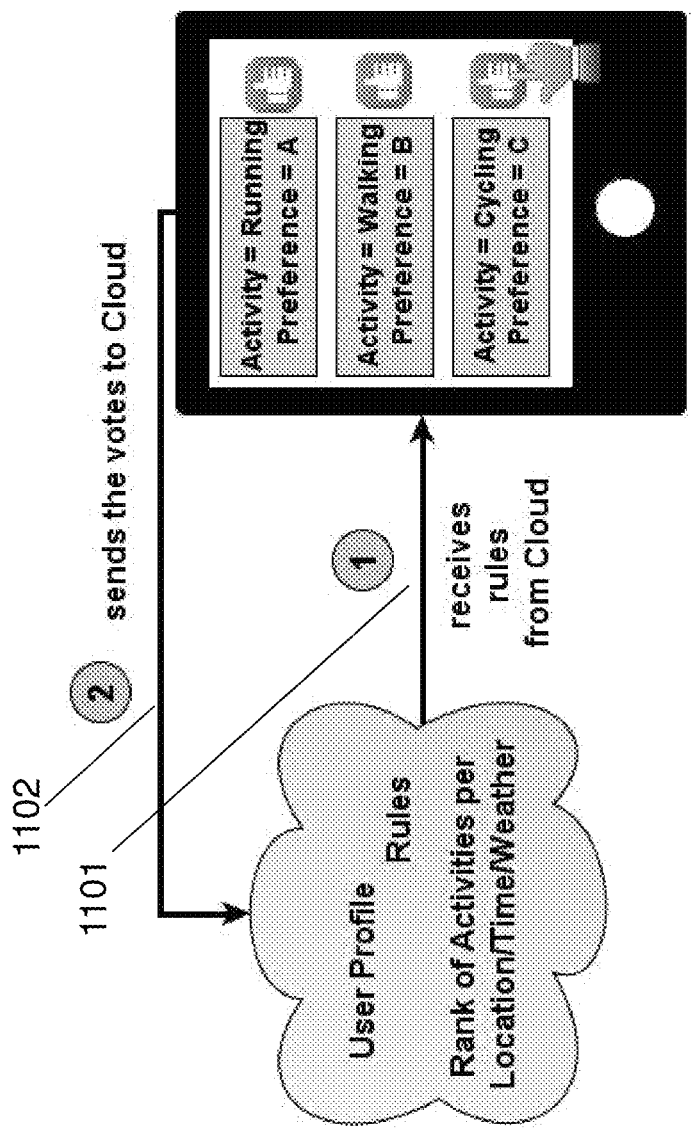
FIG. 11 shows an example 1100 of a voting mechanism.

Another example of group behavior possible with the second aspect of the invention is voting, as shown exemplarily in the scenario 1100 shown in FIG. 11. In voting, the users can vote on the preference rules, thereby expressing a weight for each rule. FIG. 11 illustrates three preference settings for three different activities received from the cloud provider in step 1101. In this exemplary embodiment, the user can vote on these different settings, thereby indicating whether he/she likes or not each preference P_n associated with the activity. The votes are sent to the cloud provider in step 1102 and used then be used to adjust the rules for that user and other users that perform the same physical activity.

Thus, in the second aspect of the present invention, users have a mechanism by which different physical activities can be ranked, a version of which was shown in FIG. 9. To achieve this ranking, for each physical activity A at a given location, time, and weather condition, the number of times that the activity has been selected is computed. This activity and its occurrence number are then added to a list L, and the list can then be sorted in descending order, as reflecting user preferences for a specific location. This list can then be accessed by first-time users in this specific location.

Moreover, in the second aspect, a user can refine preferences, a version of which is demonstrated in FIG. 10. As an initial definition, each physical activity A with a certain threshold and a combined set of attributes with thresholds generates a preference based on the physical activity, attributes and thresholds. The concept of refinement and the voting shown in FIG. 11 then permit, for each vote for the preference associated with the rule OR for each creation of a new preference for the physical activity, attributes and thresholds, a refinement of the rules with associated physical activity and preferences, as possible by interfacing users with shared computing infrastructure.

Use Examples of the Second Aspect of the Invention

1) Email and Calendar Application

For example, the user went jogging in the morning in a sunny day at the park near to his/her house and connected his/her headset to the device to listen to some music.

When the user arrives at the park, the application shows a ranked list of physical activities (e.g., jogging, running, walking and cycling) that users perform at this park at this time. Thus, the user selects the jogging from the list and the system automatically sets the preferences for this activity. Note that if the user goes every morning jogging at the same park, this information is in the user profile, so that the system can configures automatically the preference, thereby skipping the ranked list step that was explained in FIG. 10.

Suppose, an important meeting is cancelled while the user is running. Instead of sending a text message, the message will be delivered according to the preference rule. Thus, the volume would slightly increase and the message would be read out at slower than the usual speed.

2) Cycling and Web Browsing News

A user who is cycling at the gym (after work in rainy day) opens his/her device to read news via a web browsing application. The present invention can identify the preference based on the rules and determine that a website with a more illustrative and bigger font sizes should be used to provide news-related content do the user. The number of figures and the font sizes could be determined by the intensity of the physical activity. The user can modify the preference and configure to listen to the news instead of reading for that specific activity.

Exemplary Hardware Implementation

Figure 12:
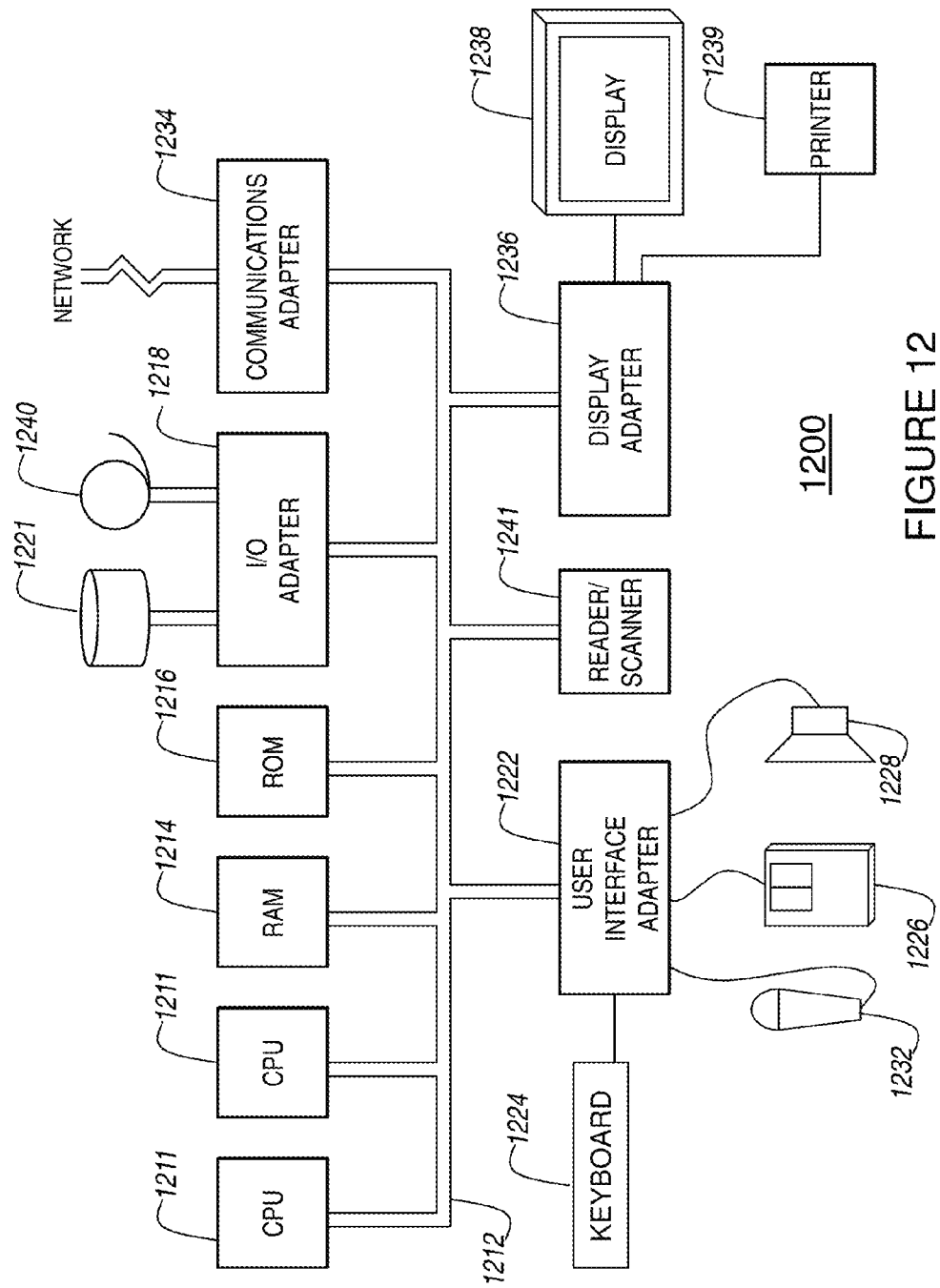
FIG. 12 illustrates an exemplary hardware/information handling system architecture 1200 for incorporating the present invention therein.
Figure 13:
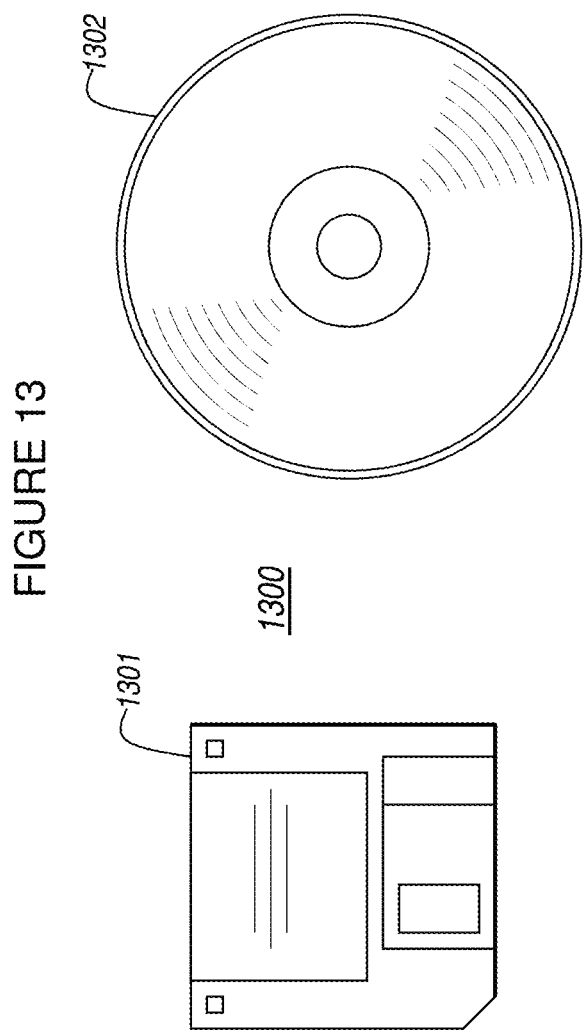
FIG. 13 illustrates non-transitory, signal-bearing storage media 1300 (e.g., storage media) for storing steps of a program of a method according to the present invention.

FIG. 12 illustrates a typical hardware configuration of architecture 1200 of an information handling/computer system that might implement concepts of the invention and which has at least one processor or central processing unit (CPU) 1211. FIG. 12 can be considered as demonstrating exemplary generic architecture for a processor-like device that could implement either the user mobile device or a device in the shared computing infrastructure.

The CPUs 1211 are interconnected via a system bus 1212 to a random access memory (RAM) 1214, read-only memory (ROM) 1216, input/output (I/O) adapter 1218 (for connecting peripheral devices such as disk units 1221 and tape drives 1240 to the bus 1212), user interface adapter 1222 (for connecting a keyboard 1224, mouse 1226, speaker 1228, microphone 1232, and/or other user interface device to the bus 1212), a communication adapter 1234 for connecting an information handling system to a data processing network, the Internet, an Intranet, a personal area network (PAN), etc., and a display adapter 1236 for connecting the bus 1212 to a display device 1238 and/or printer 1239 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1211 and hardware above, to perform the method of the invention.

This signal-bearing media may include, for example, a RAM contained within the CPU 1211, as represented by the fast-access storage for example. Alternatively, the instructions may be contained in another signal-bearing media, such as an optical disk 1301 or a magnetic data storage diskette 1302 (FIG. 13), directly or indirectly accessible by the CPU 1211.

Whether contained in the diskette 1300, the computer/CPU 1211, or elsewhere, the instructions may be stored on a variety of non-transitive, machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media, including memory devices in transmission media such as used in either digital or analog systems/components and in communication links and wireless. In an illustrative embodiment of the invention, the machine-readable instructions may comprise software object code. It is noted that, in this context, "signal-bearing" connotes both the functionality between the storage medium and the coded instructions and the functionality between the stored information and the processor that will execute the instructions.

The present invention provides a mechanism by which users of mobile devices benefit by automatically adapting content delivery based on the user's physical activities, thereby improving the user's experience and reducing the chances of recognizing relevant content such as emails, messages, and calls. The method also provides for automatic adaptation of content delivery rules based on others' preferences when performing physical activities at a given place, time, weather condition, environment luminosity, and noise level. Rules are typically defined by users themselves and can be redefined using a shared computing infrastructure that hosts rule preferences from multiple users. The shared infrastructure can also help determine user physical activities for specific sensed locations and conditions, using either a user ranking or a user voting mechanism for user preferences.

While the invention has been described in terms of various exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

Having thus described our invention, what we claim as new and desire to secure by Letters Patent is as follows:

1. A method, comprising:

receiving an input from a sensor on a mobile device;

determining, using a processor and based on said sensor input, whether a user of said mobile device is engaged in a specific physical activity;

providing instruction to make a control setting for an output function of said mobile device, for delivering a content during a period said specific physical activity is detected; and implementing said control setting on said mobile device during the period said specific physical activity continues to be detected, wherein said mobile device is connected to a shared computing infrastructure, and said determining is executed in said mobile device and at least partially includes information received from said shared computing infrastructure.

2. The method of claim 1, wherein said determining is executed by a processor on said mobile device.

3. The method of claim 1, wherein at least one of said determining and said providing instruction is executed by a processor in said shared computing infrastructure.

4. The method of claim 1, wherein said shared computing infrastructure comprises a computing infrastructure of any of:
a cloud provider;
a data center;
a remote server on a network; and a local area network.

5. The method of claim 1, wherein said control setting is derived from a rule defining a determination that said specific physical activity is currently occurring.

6. The method of claim 5, wherein said rule comprises a Boolean expression that defines whether a specific user preference is to be set, said Boolean expression comprising one or more combinations of threshold levels of attributes, a threshold comprising a predetermined level of an input from a sensor involved in a specific attribute.

7. The method of claim 6, wherein said attributes comprise any of:
a physical activity, as detected by data from a motion or accelerometer sensor;
a physical location, as detected by data from a location sensor;
environmental noise, as detected by data from a noise sensor;
environmental luminosity, as detected by data from a luminosity sensor; weather conditions, as implied from data from any source;
date, as detected by calendar data from any source; and time, as detected by clock data from any source.

8. The method of claim 5, wherein said rule is one of defined and refined, as based upon access to information from a shared computing infrastructure.

9. The method of claim 8, wherein preferences at a specific location are derived by the shared computing infrastructure from users' behaviors in that specific location, thereby the shared computing infrastructure detects group behaviors to create preferences that can be presented to users at that specific location, including first-time visitors.

10. The method of claim 8, wherein a user can selectively rank rules based on often performed physical activities and upon user's own preferences.

11. The method of claim 10, wherein the user ranking is provided back to said shared computing infrastructure.

12. The method of claim 8, wherein a user can vote on preferences and such vote is returned to the shared computing infrastructure.

13. The method of claim 1, as tangibly embodied as a set of computer-readable instructions tangibly embodied on a non-transitory, signal-bearing storage medium.

14. The method according to claim 1, wherein said output functions comprise at least one of audio, visual, and tactile output functions of said mobile device.

15. The method according to claim 1, wherein said control setting comprises at least one of setting: an audio volume level; a reading speed; a font size; a website selection to be displayed; a vibrator level; a speed of presentation/delivery of data; and a selection of an output function mechanism to be used.

16. A mobile device, comprising:
a sensor;
a processor for making a control setting for an output function of said mobile device, for delivering a content during a period a specific physical activity is detected, as based on outputs from said sensor,
wherein the processor implements and maintains the output function control setting during the period the specific physical activity continues to be detected; and
an interface with a shared computing infrastructure, wherein a processor in said shared computing infrastructure determines said control setting for said mobile device and provides said control setting to said mobile device.

17. The device of claim 16, wherein said processor receives said outputs from said sensor and determines whether a user is currently engaged in said specific activity.

18. The device of claim 16, wherein said sensor comprises one of: an accelerometer; a motion sensor; a location sensor; a GPS (Global Position System) sensor; a noise sensor; a luminosity sensor; a source for calendar data; and a source for clock data.

19. A method, as executed by one or more computers, in a shared computing infrastructure, said method comprising:
receiving information from a user mobile device, including information related to a sensor on said user device;
determining a control setting for an output function of said user mobile device, for delivering a content during a period a specific activity is detected, as based on outputs from said sensor; and
transmitting a signal to said user mobile device to implement said output function control setting, wherein
said user mobile device is connected to a shared computing infrastructure, and
said determining is executed in said user mobile device and at least partially includes information received from said shared computing infrastructure.

* * * * *